(12) United States Patent  
Rhodes et al.

(10) Patent No.: US 6,869,138 B2
(45) Date of Patent: Mar. 22, 2005

(54) UNDERFLOOR STOWAGE OF A FOLDING SEAT IN A VEHICLE

(75) Inventors: Louis A Rhodes, Farmington Hills, MI (US); Douglas J Quigley, Rochester, MI (US); Joseph L Salani, Oxford, MI (US); Carl Mather, Lake Orion, MI (US); John V Keane, Auburn Hills, MI (US); David J Ewers, Leonard, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/646,187

(22) Filed: Aug. 22, 2003

(65) Prior Publication Data

US 2004/0100115 A1 May 27, 2004

Related U.S. Application Data

(60) Provisional application No. 60/405,453, filed on Aug. 23, 2002.

(51) Int. Cl.⁷ ............................................. B60N 2/30
(52) U.S. Cl. ...................... 297/15; 296/65.09
(58) Field of Search .................... 297/15; 296/65.05, 296/65.09

(56) References Cited

U.S. PATENT DOCUMENTS

| | | | |
|---|---|---|---|
| 847,707 A | * 3/1907 | Spindler | 297/15 |
| 1,887,947 A | 11/1932 | Savale | |
| 4,005,902 A | 2/1977 | Balin | |
| 4,699,418 A | * 10/1987 | Plavetich | 296/65.09 |
| 4,846,520 A | 7/1989 | Acuto et al. | |
| 4,925,228 A | 5/1990 | Pipon et al. | |
| 5,038,437 A | 8/1991 | Russell et al. | |
| 5,195,795 A | * 3/1993 | Cannera et al. | 297/15 |
| 5,269,581 A | 12/1993 | Odagaki et al. | 296/66 |
| 5,482,349 A | 1/1996 | Richter et al. | |
| 5,492,386 A | 2/1996 | Callum | 296/64 |
| 5,527,087 A | 6/1996 | Takeda et al. | |
| 5,570,931 A | 11/1996 | Kargilis et al. | |
| 5,839,773 A | * 11/1998 | Ban et al. | 297/15 |
| 5,868,451 A | 2/1999 | Uno et al. | |
| 5,871,255 A | 2/1999 | Harland et al. | |
| 5,890,758 A | 4/1999 | Pone et al. | |
| 5,927,789 A | 7/1999 | Mezzadri et al. | |
| 5,975,612 A | 11/1999 | Macy et al. | |
| 5,979,964 A | 11/1999 | Ban et al. | 296/66 |
| 6,000,751 A | 12/1999 | Kato et al. | 297/15 |
| 6,089,641 A | 7/2000 | Mattarella et al. | |
| 6,106,046 A | * 8/2000 | Reichel | 296/65.09 |
| 6,123,380 A | 9/2000 | Sturt et al. | 296/65.09 |
| 6,129,404 A | 10/2000 | Mattarella et al. | |
| 6,129,405 A | 10/2000 | Miyahara et al. | |
| 6,193,317 B1 | 2/2001 | Mitschelen et al. | |

(List continued on next page.)

FOREIGN PATENT DOCUMENTS

| | | |
|---|---|---|
| EP | 000120817 | 10/1984 |
| EP | 002575708 | 7/1986 |
| FR | 2735081 | 12/1996 |
| JP | 363227435 | 9/1988 |
| JP | 401095947 | 4/1989 |
| JP | 411005477 | 1/1999 |
| JP | 2003094997 | 4/2003 |
| JP | 2003212017 | 7/2003 |
| JP | 3507480 | 3/2004 |
| KR | 98057165 | 9/1998 |
| WO | WO 0002/14104 | 2/2002 |

*Primary Examiner*—Peter R. Brown
(74) *Attorney, Agent, or Firm*—Ralph E. Smith

(57) ABSTRACT

A folding seating apparatus, for on-board stowage of an optionally deployable passenger seat, in a vehicle having a floor defining a floor surface that may be entirely flat when the seating apparatus is stowed. The seating apparatus includes a stowable seat having a seat cushion supported on one or more legs above the floor, a seat back that is foldable upon the seat cushion for stowage of the seat, and a seat receiving recess in the floor for on-board stowage of the seat.

15 Claims, 7 Drawing Sheets

U.S. PATENT DOCUMENTS

| | | | |
|---|---|---|---|
| 6,231,101 B1 | 5/2001 | Kamida et al. | 296/63 |
| 6,234,553 B1 | 5/2001 | Eschelbach et al. | 296/65.14 |
| 6,270,140 B1 | 8/2001 | Opfer et al. | |
| 6,279,982 B1 | 8/2001 | Nishimura et al. | |
| 6,332,650 B1 | 12/2001 | Krist et al. | |
| 6,352,310 B1 | 3/2002 | Schmidt et al. | |
| 6,371,559 B1 | 4/2002 | Kienzle et al. | |
| 6,398,307 B1 | 6/2002 | Schmidt et al. | |
| 6,406,084 B1 | 6/2002 | De Campos et al. | |
| 6,416,107 B1 | 7/2002 | Kanaguchi et al. | |
| 6,425,619 B2 | 7/2002 | Ney | |
| 6,464,279 B1 | 10/2002 | Schambre et al. | |
| 6,629,721 B1 | 10/2003 | Macey | |
| 6,644,730 B2 * | 11/2003 | Sugiura et al. | 297/15 |
| 6,648,393 B1 | 11/2003 | Milnar et al. | |
| 6,682,120 B2 | 1/2004 | Kamida et al. | 296/65.09 |
| 6,688,666 B2 | 2/2004 | Neale et al. | |
| 6,705,658 B2 | 3/2004 | Jach et al. | |
| 2001/0002759 A1 | 6/2001 | Nishide | |
| 2001/0054835 A1 * | 12/2001 | Feng | 297/15 |
| 2003/0094830 A1 * | 5/2003 | Kamida et al. | 296/65.09 |

\* cited by examiner

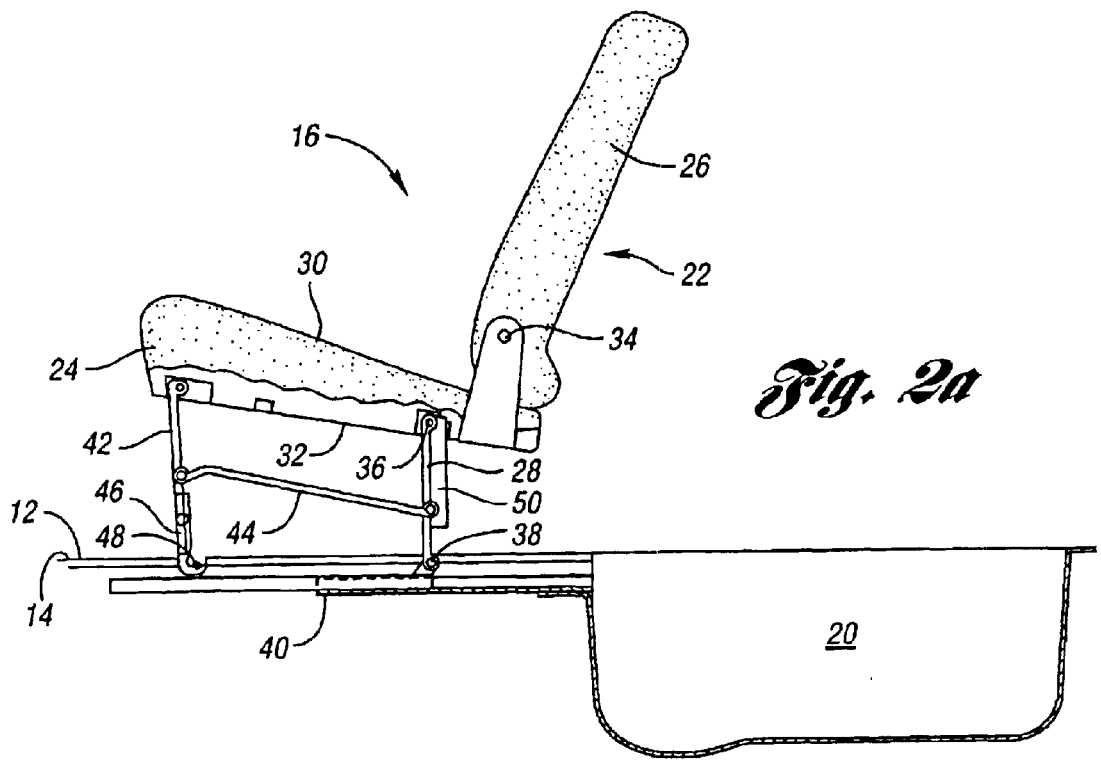
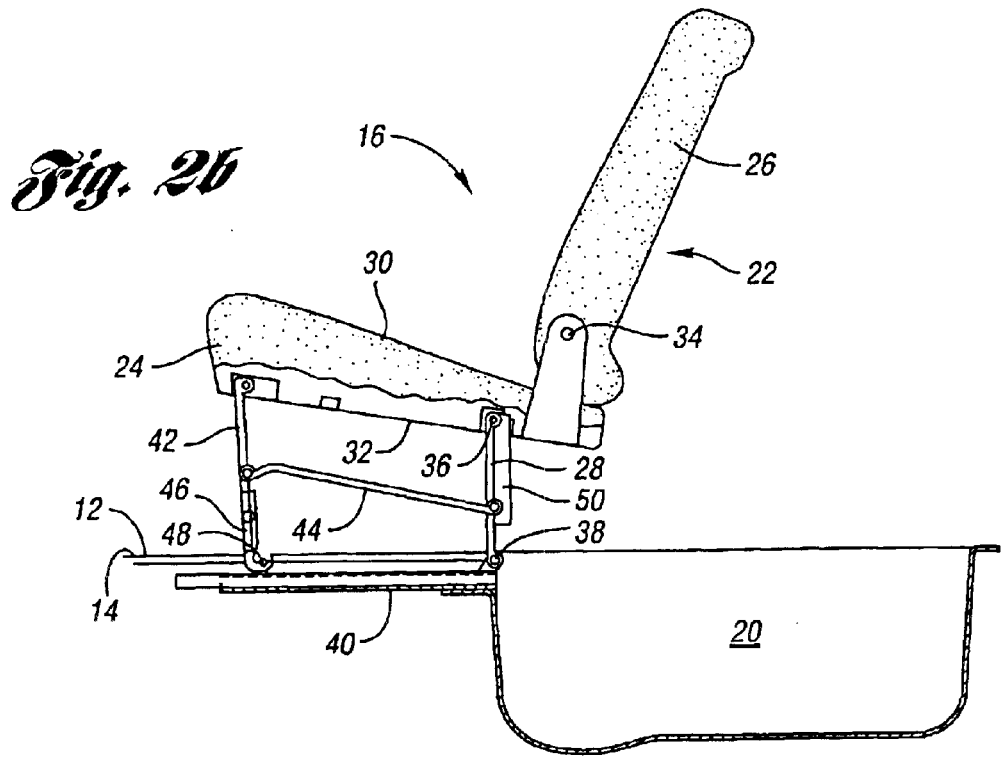

UNDERFLOOR STOWAGE OF A FOLDING SEAT IN A VEHICLE

CROSS-REFERENCE TO RELATED APPLICATION(S)

This application claims the benefit of Provisional Patent Application No. 60/405,453, filed Aug. 23, 2002.

TECHNICAL FIELD OF THE INVENTION

This invention relates to vehicles, such as vans, mini-vans and sport utility vehicles, having a multi-use compartment that can be alternately configured for seating of passengers or carrying cargo, and more particularly to passenger seating that can be optionally stowed on-board such vehicles, for providing expanded cargo carrying capacity.

BACKGROUND OF THE INVENTION

In vehicles such as vans, mini-vans and sport utility vehicles, it is desirable that passenger seating arrangements be optionally stowable on-board the vehicle, in a manner that provides a large, unimpeded volume for carrying cargo. It is also desirable that the stowable passenger seating arrangements have cushions that support passengers at a height above the floor that is approximately at the same level as the driver and any front seat passengers, so that the passengers seated on the stowable seats can enjoy the view through vehicle windows and enter and exit the stowable seats, when the stowable seats are deployed, without having to step up out of a seating well in the floor. It is especially desirable that the floor of the cargo area be flat when the seating is stowed, to facilitate loading and carrying large sized cargo, such as sheets of plywood, large cartons, or bulky items such as bicycles or other recreation equipment.

U.S. Pat. No. 6,416,107 B1, to Kanaguchi, et al., discloses a forward facing bench-type seat mounted as the rearmost-row seat on a raised portion of a floor surface extending rearwardly from the rearmost-row seat, toward the rear of a vehicle. A seat receiving recess is formed in and extends downwardly from the raised floor surface extending rearwardly from the rearmost-row seat. The rearmost row seat can be folded in such a manner that a seat back thereof is brought down forwardly to be laid on a seat cushion thereof, and the folded seat can be turned rearwardly about rotation shafts to be received in the seat-receiving recess. The raised floor surface, in which the seat receiving recess is formed, is disposed at a level higher than a foot-resting floor seat for the rearmost-row seat. The rotation shafts on the seat cushion of the rearmost-row seat are disposed at a level that is lower than the floor surface, in which the seat-receiving recess is formed and also is lower than an upper side of the receiving recess.

The approach to providing stowable seating disclosed in Kanaguchi is less than desirable, because the seat must be mounted on a raised floor surface. The raised floor surface consumes space inside the vehicle that could be used for carrying cargo, and results in a floor surface that is stepped up at the rear, rather than being totally flat.

What is needed, is a new approach to providing passenger seating that can optionally be stowed on-board the vehicle in a manner providing the desired features and functionality described above.

SUMMARY OF THE INVENTION

Our invention provides a stowable, folding seating apparatus, for a vehicle having a floor defining a floor surface that may be entirely flat when the seating apparatus is stowed. The seating apparatus includes a stowable seat having a seat cushion supported on one or more legs above the floor, and a seat receiving recess in the floor for on-board stowage of the seat. The seat may also include a seat back that is foldable upon the seat cushion for stowage of the seat in the seat receiving recess.

In one form of our invention, the stowable seating apparatus includes a seat receiving recess in the floor, extending downward from the floor surface and opening upward through the floor surface, and a seat having a seat cushion and a leg operatively attaching the seat cushion to the floor for selective movement of the seat with respect to the seat receiving recess between a deployed position of the seat and a stowed position of the seat in the seat receiving recess.

The seat cushion has an upper surface for receiving the buttocks of a passenger when the seat is in the deployed position, and a lower surface facing the floor surface when the seat is in the deployed position. The seat cushion is inverted when the seat is in the stowed position with the upper surface of the seat cushion facing downward in the seat receiving recess and the lower surface of the seat cushion facing upward in the seat receiving recess.

The leg includes an upper pivot operatively attached to the lower surface of the seat cushion and a lower pivot operatively attached to the floor, for selective pivoting movement of the seat between the deployed and the stowed positions of the seat, by pivoting the seat cushion about the upper pivot, and pivoting the leg about the lower pivot between a substantially vertical deployed position of the leg and a substantially horizontal stowed position of the leg, with the leg in the substantially horizontal stowed position extending into the seat receiving recess in a direction substantially parallel to the floor surface.

In another form of our invention, the seat receiving recess extends downward from the floor surface and opens upward through the floor surface. The seat has a seat cushion, a foldable seat back, and a leg operatively attaching the seat cushion to the floor for selective movement of the seat, with respect to the seat receiving recess, between a deployed position of the seat, an intermediate position of the seat, and a stowed position of the seat.

The seat cushion includes an upper surface for receiving the buttocks of a passenger when the seat is in the deployed position, and a lower surface facing the floor surface when the seat is in the deployed position. The foldable seat back is pivotably attached to the seat cushion to be foldable upon the upper surface of the seat cushion to a folded position of the seat back, and openable to an open position of the seat back for supporting the back of a passenger seated upon the cushion.

The leg has an upper pivot operatively attached to the lower surface of the seat cushion and a lower pivot operatively attached to the floor for selective movement of the leg between a substantially vertical deployed position of the leg, for supporting the seat cushion in the deployed position of the seat whereat the seat cushion extends substantially perpendicular to the leg, and a substantially horizontal stowed position of the leg whereat the leg extends into the recess in a direction substantially parallel to the floor surface.

The seat cushion is operatively attached to the upper pivot of the leg for selective movement with respect to both the seat receiving recess and the leg, between the deployed position of the seat, whereat the seat cushion extends substantially perpendicular to the leg with the leg in the deployed position of the leg and the seat back is in either the open or the folded position, and the intermediate position of the seat whereat the seat cushion with the seat back folded thereupon extends substantially perpendicularly to the leg with the leg in the stowed position of the leg.

The seat cushion with the seat back folded thereupon is foldable from the intermediate position of the seat to the stowed position of the seat within the seat receiving recess, by pivoting the seat cushion with the seat back folded thereupon about the upper pivot of the leg and into the seat receiving recess.

In some forms of our invention, the seat does not extend above the floor surface when stowed in the seat receiving recess in the floor. The seating apparatus may include a cover for closing the seat receiving recess, with the cover having an upper surface thereof extending substantially parallel to the floor surface when the cover is closing the seat receiving recess.

A seating apparatus, according to our invention, may include a passenger seat in which the seat cushion, seat back and leg are foldable in a forward direction in the vehicle, for stowage in a seat receiving recess located forward of the deployed position of the seat. In alternate forms of our invention, the seat cushion, seat back and leg are foldable in a rearward direction in the vehicle, for stowage in a seat receiving recess located rearward of the deployed position of the seat. In yet other forms of our invention, the seat cushion, seat back and leg are foldable in a transverse direction in the vehicle, for stowage in a seat receiving recess located beside the deployed position of the seat.

Our invention may also take the form of a method for operating a seating apparatus according to our invention, as described above or in the subsequent detailed description.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

BRIEF DESCRIPTION OF THE DRAWINGS

FIGS. 2a–2e are side views of the first exemplary embodiment of FIG. 1, showing the third row seating apparatus in a deployed position, an intermediate position, and a stowed position.

FIGS. 3a–3f are perspective views of the first exemplary embodiment shown in FIGS. 1 and 2a–2e.

DETAILED DESCRIPTION

Figure 1:
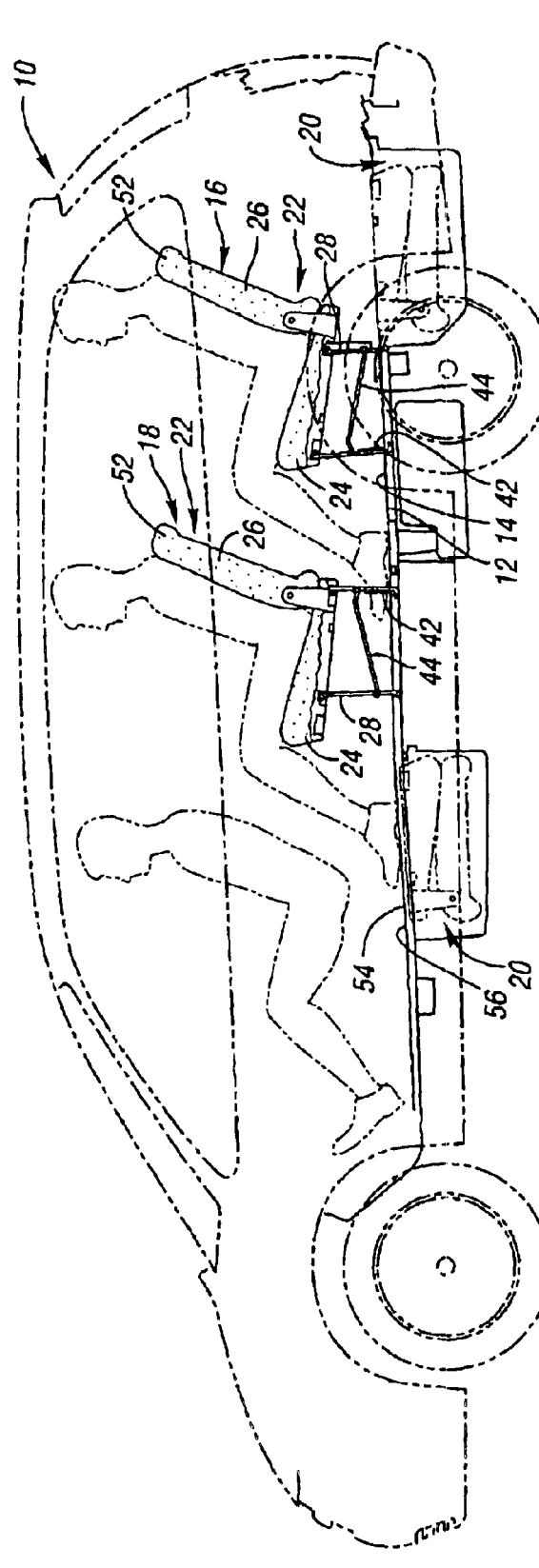
FIG. 1 is a side view of vehicle, showing a first embodiment of the invention, in the form of third row seating apparatus, and a second embodiment of the invention, in the form of a second row seating apparatus.

FIG. 1 shows a vehicle 10 having a floor 12 defining a flat upper surface 14 of the floor, including a first exemplary embodiment of the invention, in the form of a stowable third row seating apparatus 16, and a second exemplary embodiment of the invention, in the form of a stowable second row seating apparatus 18.

FIGS. 1, 2a–e and 3a–f show details of the construction and operation of the stowable third row seating apparatus 16.

The third row seating apparatus 16 includes a seat receiving recess 20 in the floor 12 of the vehicle 10, and a seat 22 that is stowable on-board the vehicle 10, below the floor surface 14, in the seat receiving recess 20.

The seat receiving recess 20, in the floor 12, extends downward from the floor surface 14 and opens upward through the floor surface 14.

Figure 2C:
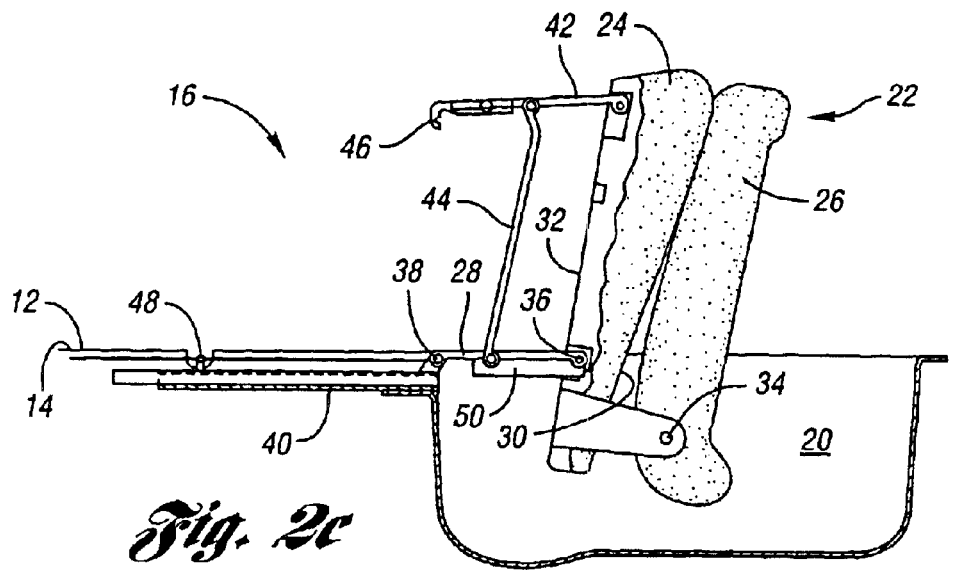
Figure 2D:
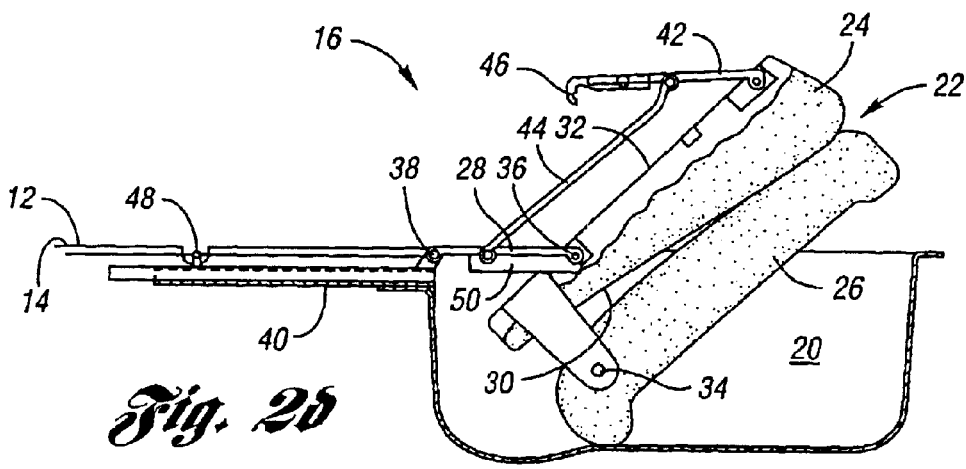
Figure 2E:
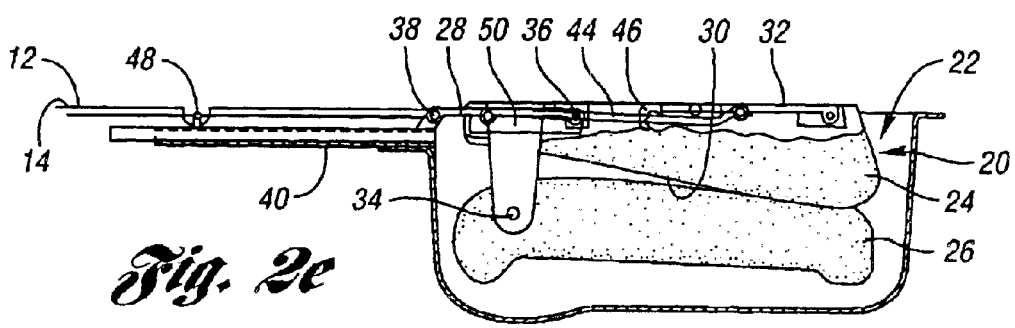
Figure 3A:
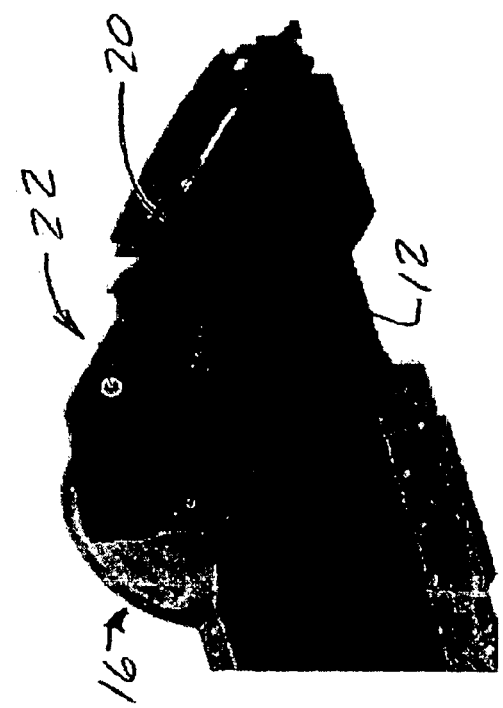

The seat 22 includes a seat cushion 24, a foldable seat back 26, and a pair of legs 28 operatively attaching the seat cushion 24 to the floor 12, for selective movement of the seat 22 with respect to the seat receiving recess 20, between a deployed position of the seat 22, an intermediate position of the seat, and a stowed position of the seat 22. The deployed position of the seat 22 is shown in FIGS. 1, 2a and 2b, and FIGS. 3a and 3b. The intermediate position of the seat is shown in FIGS. 2c and 3d, and the stowed position of the seat 22 is shown in FIGS. 2e and 3f. FIG. 1 also illustrates the stowed position of the seat 22 for both the second row seating apparatus 18 and third row seating apparatus 16.

The seat cushion 24 has an upper surface 30 for receiving the buttocks of a passenger (as illustrated in FIG. 1) when the seat 22 is in the deployed position, and a lower surface 32 facing the floor surface 14 when the seat 22 is in the deployed position. The foldable seat back 26 is pivotably attached, as indicated at 34, to the seat cushion 24, to be foldable upon the upper surface 30 of the seat cushion 24 to a folded position of the seat back 26, as shown in FIGS. 2c–2e and FIGS. 3b–3f, and openable to an open position of the seat back 26, as shown in FIGS. 1, 2a, 2b, and 3a, for supporting the back of a passenger seated upon the seat cushion 24, as illustrated in FIG. 1.

Each of the legs 28 has an upper pivot 36 operatively attached to the lower surface 32 of the seat cushion 24, and a lower pivot 38 operatively attached to a movable seat positioning track 40, of conventional construction, in the floor 12, allowing the fore and aft position of the seat 22 to be adjusted, with respect to the seat receiving recess 20, as shown in FIGS. 2a and 2b.

When the seat 22 is positioned along the track 40 at a point adjacent the seat receiving recess 20, as shown in FIG. 2b, the lower pivot 38 allows the seat 22 to be moved between the deployed and intermediate positions of the seat. The lower pivot 38 allows the legs 28 to be selectively moved between a substantially vertical deployed position of the legs 28, as shown in FIGS. 2a and 2b, and in FIGS. 3a and 3b, for supporting the seat cushion 24 in the deployed position of the seat 22, whereat the seat cushion 24 extends substantially perpendicularly to the legs 28, and a substantially horizontal stowed position of the legs 28, as shown in FIGS. 2c through 2d, and FIGS. 3e and f, whereat the legs 28 extend into the recess 20 in a direction substantially parallel to the floor surface 14.

The seat cushion 24 is operatively attached to the upper pivot 36 of the legs 28 for selective movement with respect to both the seat receiving recess 20 and the legs 28, between the deployed position of the seat 22, the intermediate position of the seat 22 and the stowed position of the seat 22.

Figure 3B:
Figure 3B:
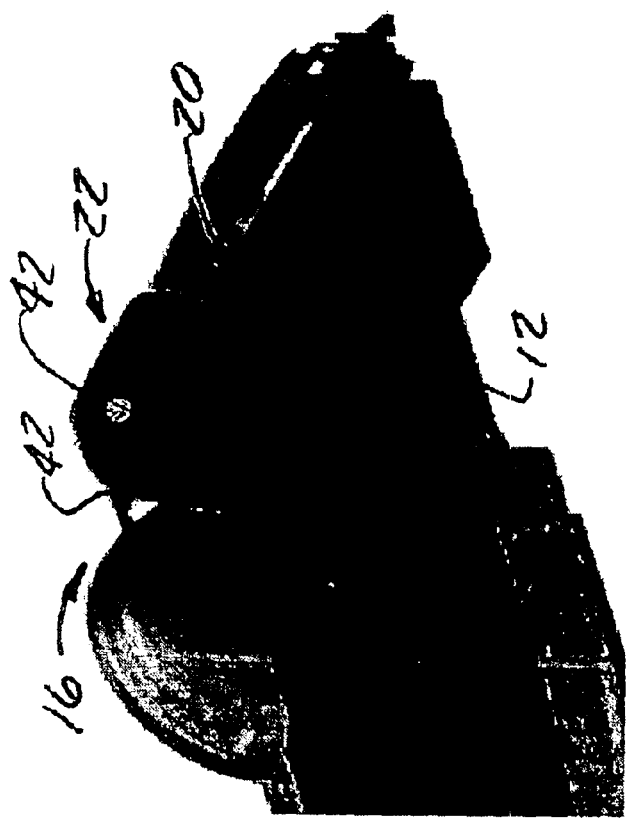
Figure 3C:
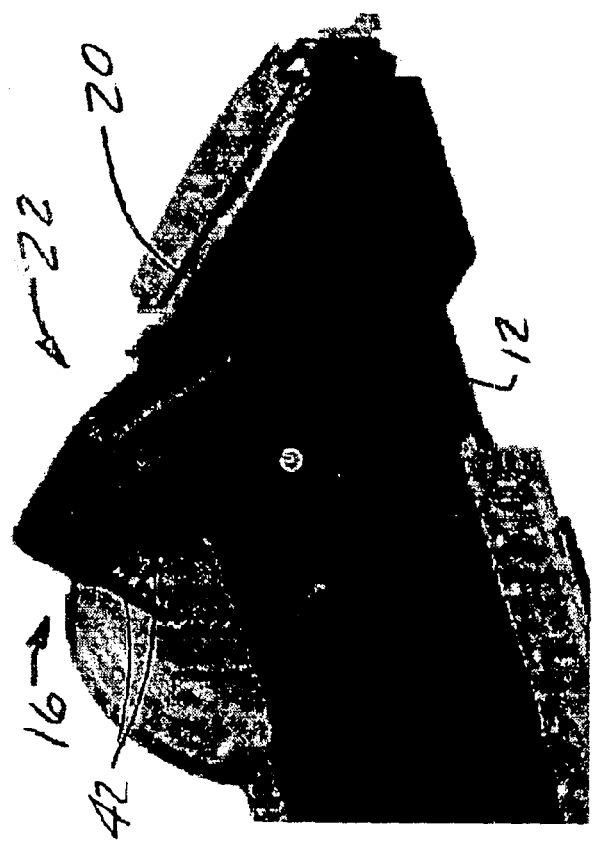
Figure 3F:
Figure 3E:
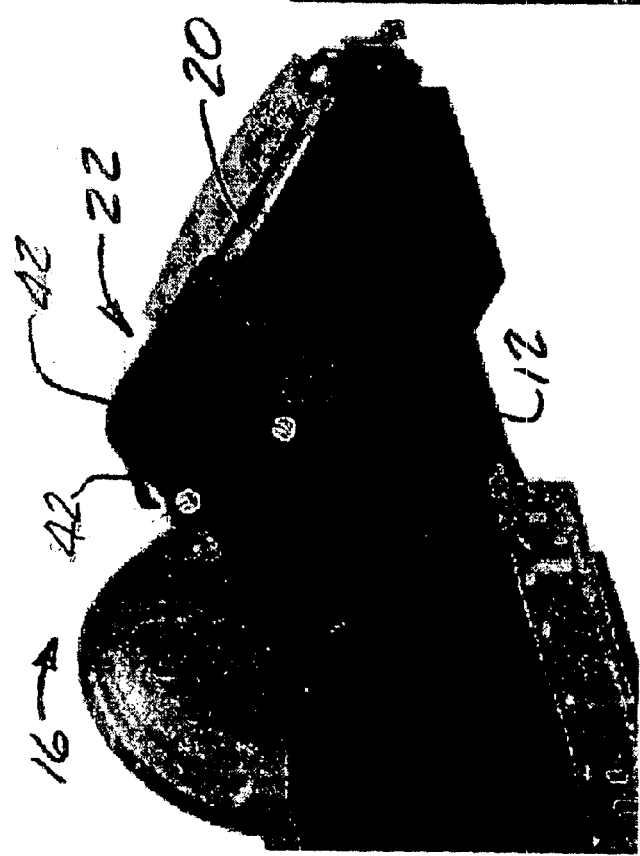

When the seat 22 is in the deployed position, as shown in FIGS. 1, 2a–2b, and FIGS. 3a and 3b, the seat cushion 24 extends substantially perpendicular to the legs 28, with the legs 28 in the deployed position of the legs 28, and the seat back 26 in either the open or the folded position of the seat back 26, as shown in FIGS. 3a and 3b. The back side of the seat back 26 can be configured to provide cup holders, and to form a mini-table, when the seat back 26 is in the folded position, as is known in the art.

In the intermediate position of the seat 22, the seat cushion 24, with the seat back 26 folded thereupon, extends substantially perpendicularly to the legs 28, with the legs 28 in the stowed position of the legs 28, as shown in FIGS. 2c and 3d.

The seat cushion 24, with the seat back 26 folded thereupon, is foldable from the intermediate position of the seat 22 to the stowed position of the seat 22 within the seat receiving recess 20, by pivoting the seat cushion 24 with the seat back 26 folded thereupon about the upper pivot 36 of the legs and into the seat receiving recess 20, as shown in FIGS. 3d–3f.

When the seat 22 is in the stowed position, the seat cushion 24 is inverted from its position when the seat 22 is deployed, with the upper surface 30 of the seat cushion 24 facing down into the seat receiving recess 20 and the lower surface 32 of the seat receiving recess 20 facing upward.

The stowable seating apparatus 16 further includes a pair of second legs 42 pivotably attached to the lower surface 32 of the seat cushion 24 for movement between a deployed position of the second legs 42 and a stowed position of the second legs 42. In the deployed position of the second legs 42, as shown in FIGS. 1, 2a–2c, 3a–3d, the second legs 42 extend substantially perpendicular to the seat cushion 24 for supporting the seat cushion 24 above the floor 12 when the seat 22 is in the deployed position. In the stowed position of the second legs 42, the second legs 42 extend substantially parallel to the seat cushion 24. One or more helper links 44 are operatively connected between the legs 28 and the second legs 42 for pivoting the second legs 42 from the stowed position of the second legs 42 to the deployed position of the second legs 42 as the seat 22 is pivoted from the intermediate position to the deployed position of the seat 22, and for pivoting the second legs 42 from the deployed position of the second legs 42 to the stowed position of the second legs 42 as the seat 22 is pivoted from the deployed position to the intermediate position of the seat 22.

A releasable latch 46 is attached to the distal end of each of the second legs 42 for engaging a seat anchorage 48 on the seat position adjustment track 40 to lock the seat 22 in the deployed position of the seat 22. In embodiments of our invention that do not include the seat adjustment track 40, the seat anchorage 48 may be of the conventional dog-bone, bar type, located in a small receptacle embedded in the floor 12, as is known in the art.

The steps required for stowing the seat 22 in the seat receiving recess 20 are shown sequentially in FIGS. 2a–2e, and FIGS. 3a–3f. The seat 22 is first moved to the end of the seat position adjustment track 40 closest to the seat receiving recess 20, as shown in FIG. 2b, and the seat back 26 is folded down upon the seat cushion, as shown in FIG. 3b, to the folded position of the seat back 26. The latches 46 on the distal ends of the second legs 42 are released to disengage the latches 46 from the seat anchorages 48, and the seat 22 is pivoted about the lower pivot 38 of the legs 28, from the deployed to the stowed position of the legs, to move the seat 22 with the seat back 26 folded upon the seat cushion 24 from the deployed position of the seat 22 to the intermediate position of the seat 22. The seat cushion 24 with the seat back 26 folded thereupon is then pivoted around the upper pivot 36 into the seat receiving recess 20, to move the seat 22 from the intermediate to the stowed position of the seat 22. The steps are reversed for moving the seat 22 from the stowed position to the deployed position of the seat 22.

The seat 22 also includes a force generating device 50, and/or a motion damping device, (also designated as reference numeral 50), operatively attached between at least one leg 28 and the seat cushion 24 for urging the seat cushion 24 to move toward in a generally perpendicular relationship to the leg 28, and/or for resisting motion of the seat from the intermediate to the stowed positions of the seat 22. The force generating/motion resisting device 50 is provided to assist and facilitate the efforts of a person in moving the seat 22 between the deployed, intermediate and stowed positions of the seat 22.

It is contemplated that the force generating/motion resisting device 50 can be provided by any number of suitable devices known in the art, such as a tension pivot having a torsion spring, a tension spring, a compression spring, a gas charged cylinder, or a dashpot. In other embodiments of our invention, it may be desirable to incorporate the force generating/motion resisting device into the lower pivot 38, or into other pivoting joints of the mechanism formed by the seat cushion 24, leg 28, second leg 42, helper ling 44 and floor 12.

The second exemplary embodiment of seating apparatus 18, according to our invention, is identical in construction and operation to the first exemplary embodiment 16, as described above, except for the location of the seat receiving recess 20 with respect to the seat 22, and the location of attachment of the seat back 26 to the seat cushion 24.

As shown in FIG. 1, in the third row seating apparatus 16, the seat receiving recess is located behind the seat 22, and in the seating apparatus 18, the seat receiving recess 20 is located in front of the seat 22.

In the third row seating apparatus 16, the seat back 26 is attached to the seat cushion 24 at the rear (as shown in FIG. 1) of the seat cushion 24 at a point above the legs 28, and the distal end 52 of the seat back 26 folds away from the seat receiving recess 20, for moving the seat back 26 to the folded position thereof, when the seat 22 is in the deployed position.

In the second row seating apparatus 18, the seat back 26 is attached to the seat cushion 24 at the rear (as shown in FIG. 1) of the seat cushion 24, but at a point above the second legs 42, rather than above the legs 28 as was the case in the third row seating apparatus 16, and the distal end 52 of the seat back 26 folds toward the seat receiving recess 20, for moving the seat back 26 to the folded position thereof, when the seat 22 is in the deployed position.

Figure 4:
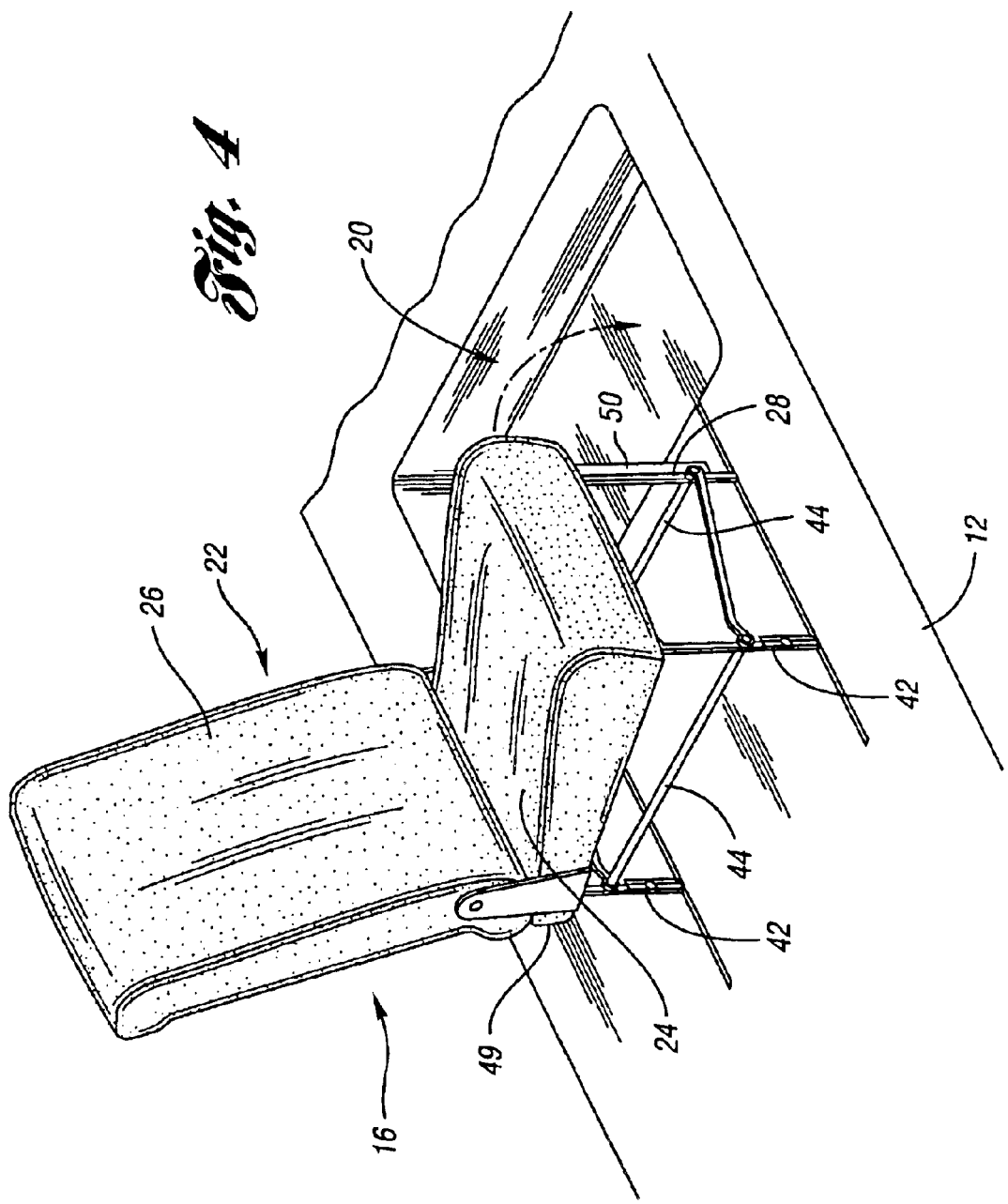
FIG. 4 is a perspective view of a third exemplary embodiment of a seating apparatus, according to the invention.

In other embodiments of our invention, where it is desired to have a passenger on the seat 22 facing across the vehicle rather than forward as shown in FIG. 1, it may be desirable to attach the seat back 26 to a side 49 of the seat cushion 24, as shown in FIG. 4, so that distal edge 52 of the seat back 26 folds in a direction parallel to the seat receiving recess 20 when the seat 22 is in the deployed position. Those having skill in the art will also recognize that our invention may be practiced in seating arrangements where it is desirable to have the passenger seated on the seat 22 facing rearward in the vehicle, and in vehicles where it is desirable to have the seat receiving recess 20 positioned beside the seat 22, rather than in front of or behind the seat 22, as shown in the second and third row seating apparatuses 18, 16 of the exemplary embodiments shown in FIG. 1.

As shown, in FIG. 1, with respect to the second row seating apparatus 18 of the second exemplary embodiment of our invention, a seating apparatus according to our invention may also include a cover 54 for closing the seat receiving recess 20. In many cases it will be preferred that the cover 54 have an upper surface 56 thereof that extends substantially parallel to the floor surface 14 when the cover 52 is closing the seat receiving recess 20, so that the floor surface 14 will be substantially flat when the seats 22 are stowed beneath the floor 12 in the seat receiving recesses 20. The cover 20 can be provided in a number of forms that are entirely removable during deployment and stowage of the seat 22, or movable and stowable in many forms including, a roll top cover, or a rigid cover hinged to the floor 12 as a single cover, a bi-fold cover, or multifold cover.

Those skilled in the art will also readily recognize that, while the embodiments of our invention disclosed herein are presently considered to be preferred, various changes and modifications can be made without departing from the spirit and scope of the invention. The scope of the invention is indicated in the appended claims, and all changes or modifications within the meaning and range of equivalents are intended to be embraced therein.

We claim:

1. A stowable seating apparatus for a vehicle having a floor defining a floor surface, the seating apparatus comprising:
   a seat receiving recess in the floor, extending downward from the floor surface and opening upward through the floor surface; and
   a seat having a seat cushion, a foldable seat back, and a leg operatively attaching the seat cushion to the floor for selective movement of the seat with respect to the seat receiving recess between a deployed position of the seat, an intermediate position of the seat, and a stowed position of the seat;
   the seat cushion having an upper surface for receiving the buttocks of a passenger when the seat is in the deployed position, and a lower surface facing the floor surface when the seat is in the deployed position;
   the foldable seat back pivotably attached to the seat cushion to be foldable upon the upper surface of the seat cushion to a folded position of the seat back, and openable to an open position of the seat back for supporting the back of a passenger seated upon the cushion;
   the leg having an upper pivot operatively attached to the lower surface of the seat cushion and a lower pivot operatively attached to the floor for selective movement of the leg between a substantially vertical deployed position of the leg for supporting the seat cushion in the deployed position of the seat whereat the seat cushion extends substantially perpendicular to the leg, and a substantially horizontal stowed position of the leg whereat the leg extends into the recess in a direction substantially parallel to the floor surface;
   the seat cushion being operatively attached to the upper pivot of the leg for selective movement with respect to both the seat receiving recess and the leg, between the deployed position of the seat, whereat the seat cushion extends substantially perpendicular to the leg with the leg in the deployed position of the leg and the seat back is in either the open or the folded position, and the intermediate position of the seat whereat the seat cushion with the seat back folded thereupon extends substantially perpendicularly to the leg with the leg in the stowed position of the leg;
   the seat cushion with the seat back folded thereupon foldable from the intermediate position of the seat to the stowed position of the seat within the seat receiving recess by pivoting the seat cushion with the seat back folded thereupon about the upper pivot of the leg and into the seat receiving recess, and
   a seat position adjustment track attached to the floor, and wherein the lower pivot of the leg is operatively attached to the seat position adjustment track for movement of the leg toward and away from the seat receiving recess.

2. The stowable seating apparatus of claim 1 wherein the leg, seat back and seat cushion do not extend above the floor surface when the seat is stowed in the seat receiving recess in the floor.

3. The stowable seating apparatus of claim 1 further comprising a cover for closing the seat receiving recess, the cover having an upper surface thereof extending substantially parallel to the floor surface when the cover is closing the seat receiving recess.

4. The stowable seating apparatus of claim 1, further comprising a force generating device operatively attached between the leg and the seat cushion for urging the seat cushion to move toward a generally perpendicular relationship to the leg.

5. The stowable seating apparatus of claim 1, further comprising a motion damping device operatively attached between the leg and the seat cushion for resisting motion of the seat from the intermediate to the stowed positions of the seat.

6. The stowable seating apparatus of claim 1 further comprising a second leg pivotably attached to the lower surface of the seat cushion for movement between a deployed position of the second leg, whereat the leg extends substantially perpendicular to the seat cushion for supporting the seat cushion on the floor when the seat is in the deployed position, and a stowed position of the second leg, whereat the second leg extends substantially parallel to the seat cushion.

7. The stowable seating apparatus of claim 6 wherein the leg, second leg, seat back and seat cushion do not extend above the floor surface when the seat is stowed in the seat receiving recess in the floor.

8. The stowable seating apparatus of claim 1 wherein the seat back includes a distal end thereof that folds toward the seat receiving recess when the seat is in the deployed position.

9. The stowable seating apparatus of claim 1 wherein the seat back includes a distal end thereof that folds away from the seat receiving recess when the seat is in the deployed position.

10. The stowable seating apparatus of claim 1 wherein the seat back includes a distal edge thereof that folds in a direction parallel to the seat receiving recess when the seat is in the deployed position.

11. A stowable seating apparatus for a vehicle having a floor defining a floor surface, the seating apparatus comprising:
   a seat receiving recess in the floor, extending downward from the floor surface and opening upward through the floor surface; and
   a seat having a seat cushion, a foldable seat back, and a leg operatively attaching the seat cushion to the floor for selective movement of the seat with respect to the seat receiving recess between a deployed position of the seat, an intermediate position of the seat, and a stowed position of the seat;
   the seat cushion having an upper surface for receiving the buttocks of a passenger when the seat is in the deployed position, and a lower surface facing the floor surface when the seat is in the deployed position;
   the foldable seat back pivotably attached to the seat cushion to be foldable upon the upper surface of the seat cushion to a folded position of the seat back, and openable to an open position of the seat back for supporting the back of a passenger seated upon the cushion;

the leg having an upper pivot operatively attached to the lower surface of the seat cushion and a lower pivot operatively attached to the floor for selective movement of the leg between a substantially vertical deployed position of the leg for supporting the seat cushion in the deployed position of the seat whereat the seat cushion extends substantially perpendicular to the leg, and a substantially horizontal stowed position of the leg whereat the leg extends into the recess in a direction substantially parallel to the floor surface;

the seat cushion being operatively attached to the upper pivot of the leg for selective movement with respect to both the seat receiving recess and the leg, between the deployed position of the seat, whereat the seat cushion extends substantially perpendicular to the leg with the leg in the deployed position of the leg and the seat back is in either the open or the folded position, and the intermediate position of the seat whereat the seat cushion with the seat back folded thereupon extends substantially perpendicularly to the leg with the leg in the stowed position of the leg; and the seat cushion with the seat back folded thereupon foldable from the intermediate position of the seat to the stowed position of the seat within the seat receiving recess by pivoting the seat cushion with the seat back folded thereupon about the upper pivot of the leg and into the seat receiving recess, the seating apparatus further comprising;

a second leg pivotably attached to the lower surface of the seat cushion for movement between a deployed position of the second leg, whereat the leg extends substantially perpendicular to the seat cushion for supporting the seat cushion on the floor when the seat is in the deployed position, and a stowed position of the second leg, whereat the second leg extends substantially parallel to the seat cushion; and a helper link operatively connected between the leg and the second leg for pivoting the second leg from the stowed position of the second leg to the deployed position of the second leg as the seat is pivoted from the intermediate position to the deployed position of the seat, and for pivoting the second leg from the deployed position of the second leg to the stowed position of the second leg as the seat is pivoted from the deployed position to the intermediate position of the seat.

12. The stowable seating apparatus of claim 11 wherein the leg, second leg, helper link, seat back and seat cushion do not extend above the floor surface when the seat is stowed in the seat receiving recess in the floor.

13. A stowable seating apparatus for a vehicle having a floor defining a floor surface, the seating apparatus comprising:

a seat receiving recess in the floor, extending downward from the floor surface and opening upward through the floor surface; and a seat having a seat cushion, a foldable seat back, and a leg operatively attaching the seat cushion to the floor for selective movement of the seat with respect to the seat receiving recess between a deployed position of the seat, an intermediate position of the seat, and a stowed position of the seat;

the seat cushion having an upper surface for receiving the buttocks of a passenger when the seat is in the deployed position, and a lower surface facing the floor surface when the seat is in the deployed position;

the foldable seat back pivotably attached to the seat cushion to be foldable upon the upper surface of the seat cushion to a folded position of the seat back, and openable to an open position of the seat back for supporting the back of a passenger seated upon the cushion;

the leg having an upper pivot operatively attached to the lower surface of the seat cushion and a lower pivot operatively attached to the floor for selective movement of the leg between a substantially vertical deployed position of the leg for supporting the seat cushion in the deployed position of the seat whereat the seat cushion extends substantially perpendicular to the leg, and a substantially horizontal stowed position of the leg whereat the leg extends into the recess in a direction substantially parallel to the floor surface;

the seat cushion being operatively attached to the upper pivot of the leg for selective movement with respect to both the seat receiving recess and the leg, between the deployed position of the seat, whereat the seat cushion extends substantially perpendicular to the leg with the leg in the deployed position of the leg and the seat back is in either the open or the folded position, and the intermediate position of the seat whereat the seat cushion with the seat back folded thereupon extends substantially perpendicularly to the leg with the leg in the stowed position of the leg; and the seat cushion with the seat back folded thereupon foldable from the intermediate position of the seat to the stowed position of the seat within the seat receiving recess by pivoting the seat cushion with the seat back folded thereupon about the upper pivot of the leg and into the seat receiving recess, the seating apparatus further comprising;

a second leg pivotably attached to the lower surface of the seat cushion for movement between a deployed position of the second leg, whereat the leg extends substantially perpendicular to the seat cushion for supporting the seat cushion on the floor when the seat is in the deployed position, and a stowed position of the second leg, whereat the second leg extends substantially parallel to the seat cushion;

a seat anchorage in the floor for receipt of the second leg in the deployed position of the second leg; and a releasable latch attached to a distal end of the second leg for engaging the seat anchorage when the second leg is in the deployed position of the second leg.

14. A method for stowing a foldable seat beneath a floor surface in a vehicle having a floor defining the floor surface, the method comprising:

providing a seat receiving recess in the floor, extending downward from the floor surface and opening upward through the floor surface; and providing a seat having a seat cushion, a foldable seat back, and a leg having an upper and a lower pivot for operatively attaching the seat cushion to the floor for selective movement of the seat with respect to the seat receiving recess between a deployed position of the seat, an intermediate position of the seat, and a stowed position of the seat, the seat cushion having an upper surface for receiving the buttocks of a passenger when the seat is in a deployed position, and a lower surface facing the floor surface when the seat is in the deployed position;

pivotably attaching the foldable seat back to the seat cushion to be foldable upon the upper surface of the seat cushion to a folded position of the seat back, and openable to an open position of the seat back for supporting the back of a passenger seated upon the cushion;

connecting the upper pivot of the leg to the lower surface of the seat cushion and a connecting the lower pivot of the leg to the floor for selective movement of the leg between a substantially vertical deployed position of the leg for supporting the seat cushion in the deployed position of the seat whereat the seat cushion extends substantially perpendicular to the leg, and a substantially horizontal stowed position of the leg whereat the leg extends into the recess in a direction substantially parallel to the floor surface;

connecting the seat cushion to the upper pivot of the leg for selective movement of the seat cushion with respect to both the seat receiving recess and the leg, between the deployed position of the seat, whereat the seat cushion extends substantially perpendicular to the leg with the leg in the deployed position of the leg and the seat back in either the open or the folded position, and the intermediate position of the seat whereat the seat cushion with the seat back folded thereupon extends substantially perpendicularly to the leg with the leg in the stowed position of the leg;

folding the seat back to the folded position thereof upon the seat cushion;

pivoting the leg about the lower pivot from the deployed to the stowed position of the leg to move the seat with the seat back folded upon the seat cushion from the deployed position of the seat to the intermediate position of the seat; and pivoting the seat cushion with the seat back folded thereupon about the upper pivot into the seat receiving recess to move the seat from the intermediate to the stowed position of the seat, further comprising deploying the seat by sequentially performing the steps of;

pivoting the seat cushion with the seat back folded thereupon out of the seat receiving recess by pivoting the seat cushion about the upper pivot with the leg in the stowed position thereof, to thereby place the seat in the intermediate position;

pivoting the leg about the lower pivot to move the seat from the intermediate to the deployed position, and further comprising the step of unfolding the seat back from the folded position thereof to the open position thereof;

providing a second leg pivotably attached to the lower surface of the seat cushion for movement between a deployed position of the second leg, whereat the leg extends substantially perpendicular to the seat cushion for supporting the seat cushion on the floor when the seat is in the deployed position, and a stowed position of the second leg, whereat the second leg extends substantially parallel to the seat cushion; and providing a helper link operatively connected between the leg and the second leg for pivoting the second leg from the stowed position of the second leg to the deployed position of the second leg as the seat is pivoted from the intermediate position of the seat to the deployed position of the seat, and for pivoting the second leg from the deployed position of the second leg to the stowed position of the second leg as the seat is pivoted from the deployed position to the intermediate position of the seat.

15. The method of claim 14, further comprising securing a distal end of the second leg to a seat anchorage in the floor, when the second leg is in the deployed position of the second leg.

* * * * *